US009286038B2

(12) United States Patent
Burckhardt et al.

(10) Patent No.: US 9,286,038 B2
(45) Date of Patent: Mar. 15, 2016

(54) INTERFACE DEVELOPMENT AND OPERATION

(71) Applicant: Microsoft Corporation, Redmond, WA (US)

(72) Inventors: Sebastian C Burckhardt, Sammamish, WA (US); Manuel A Faehndrich, Seattle, WA (US); Michal J Moskal, Seattle, WA (US); Sean C McDirmid, Beijing (CN); Nikolai Tillmann, Redmond, WA (US); Jonathan Paul de Halleux, Seattle, WA (US); Jun Kato, Tokorozawa (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/922,126

(22) Filed: Jun. 19, 2013

(65) Prior Publication Data

US 2014/0380205 A1    Dec. 25, 2014

(51) Int. Cl.
*G06F 9/44* (2006.01)
(52) U.S. Cl.
CPC .......................... *G06F 8/38* (2013.01)
(58) Field of Classification Search
USPC ........................................................ 717/168
See application file for complete search history.

(56) References Cited

U.S. PATENT DOCUMENTS

| | | | |
|---|---|---|---|
| 6,681,370 B2 | 1/2004 | Lawrence et al. | |
| 6,941,520 B1* | 9/2005 | Lewallen | 717/116 |
| 7,181,684 B2 | 2/2007 | Chittu et al. | |
| 7,350,204 B2* | 3/2008 | Lambert et al. | 717/172 |
| 7,496,594 B1* | 2/2009 | Cummings et al. | 717/178 |
| 7,730,102 B2 | 6/2010 | Simonyi | |
| 7,783,651 B2 | 8/2010 | Muscarella | |
| 7,877,702 B2 | 1/2011 | Mahasintunan | |
| 8,024,365 B2 | 9/2011 | Wilding et al. | |
| 8,307,331 B2* | 11/2012 | Warila et al. | 717/109 |
| 8,630,961 B2* | 1/2014 | Beilby et al. | 706/11 |
| 8,812,640 B2* | 8/2014 | Tsao | 709/223 |
| 8,898,204 B1* | 11/2014 | Sathe et al. | 707/812 |

(Continued)

FOREIGN PATENT DOCUMENTS

| EP | 1248975 | | 9/2003 |
|---|---|---|---|
| EP | 1248975 B1 | * | 9/2003 |

OTHER PUBLICATIONS

Griffiths et al. "Teallach: a model-based user interface development environment for object databases", May 2001, Elsevier Science.*

(Continued)

*Primary Examiner* — Anna Deng
*Assistant Examiner* — Junchun Wu
(74) *Attorney, Agent, or Firm* — Alin Corie; Sandy Swain; Micky Minhas

(57) ABSTRACT

Some implementations provide techniques and arrangements for interactive user interface operation and development. For instance, some implementations may generate a user interface data structure representing a user interface, the user interface data structure being generated based at least in part on state data and imperative programming code. Then, in response to a change in one of the imperative programming code or the state data, some implementations may update the user interface data structure and render an updated interactive graphical user interface based on the updated user interface data structure.

20 Claims, 12 Drawing Sheets

(56) References Cited

U.S. PATENT DOCUMENTS

| | | | |
|---|---|---|---|
| 2006/0041879 A1* | 2/2006 | Bower et al. | 717/162 |
| 2007/0273936 A1 | 11/2007 | Fujimaki | |
| 2008/0082962 A1* | 4/2008 | Falk et al. | 717/113 |
| 2012/0254801 A1* | 10/2012 | Gaffney et al. | 715/825 |
| 2012/0284653 A1 | 11/2012 | Van Ness et al. | |
| 2012/0331411 A1* | 12/2012 | Dempsey | 715/764 |
| 2014/0032609 A1* | 1/2014 | Brinkman et al. | 707/803 |
| 2014/0181160 A1* | 6/2014 | Novak et al. | 707/822 |

OTHER PUBLICATIONS

Pinheiro Da Silva et al. "Generating user interface code in a model based user interface development environment", 2000, ACM.*

Armstrong, et al., "Erlang—An Experimental Telephony Programming Language", In Proceedings of XIII International Switching Symposium, vol. 3, May 27, 1990, 6 pages.

Atkinson, Bill, "HyperCard", Published on: Aug. 1987, at: http://www2.iath.virginia.edu/elab/hfl0154.html; 2 pages.

Burnett, et al., "Implementing Level 4 Liveness in Declarative Visual Programming Languages", In Proceedings of the IEEE Symposium on Visual Languages, Sep. 1, 1998, 9 pages.

David, et al., "SELF: The Power of Simplicity", In Proceedings of the Conference on Object-Oriented Programming Systems, Languages and Applications, Dec. 1987, 20 pages.

Edwards, Jonathan, "Subtext: Uncovering the Simplicity of Programming", In Proceedings of the 20th Annual ACM SIGPLAN Conference on Object-Oriented Programming, Systems, Languages, and Applications, Oct. 16, 2005, 14 pages.

Granger, Chris, "Light Table—A Reactive Work Surface for Programming", Retrieved on: Feb. 27, 2013 at: http://www.kickstarter.com/projects/ibdknox/light-table; 13 pages.

Hancock, Christopher Michael, "Real-Time Programming and the Big Ideas of Computational Literacy", In PhD Thesis, Massachusetts Institute of Technology, Sep. 2003, 121 pages.

Hayden, et al., "Kitsune: Efficient, General-Purpose Dynamic Software Updating for C", In Proceedings of the ACM International Conference on Object Oriented Programming Systems Languages and Applications, Oct. 19, 2012, 16 pages.

Hemel, et al., "Declaratively Programming the Mobile Web with Mobl", In Proceedings of the ACM International Conference on Object Oriented Programming Systems Languages and Applications, Oct. 22, 2011, 22 pages.

"Khan Academy—Computer Science", Retrieved on: Feb. 27, 2013, at: https://www.khanacademy.org/cs; 7 pages.

Lieberman, et al., "Bridging the Gulf Between Code and Behavior in Programming", In Proceedings of the SIGCHI Conference on Human Factors in Computing Systems, May 7, 1995, 7 pages.

Lucassen, et al., "Polymorphic Effect Systems", In Proceedings of the 15th ACM SIGPLAN-SIGACT Symposium on Principles of Programming Languages, Jan. 1988, 11 pages.

Maloney, et al., "Directness and Liveness in the Morphic User Interface Construction Environment", In Proceedings of the 8th Annual ACM Symposium on User Interface Software and Technology, Nov. 14, 1995, 8 pages.

McDirmid, Sean, "Living it up with a Live Programming Language", In Proceedings of the 22nd Annual ACM SIGPLAN Conference on Object-Oriented Programming Systems and Applications, Oct. 21, 2007, 13 pages.

Muratori, Casey, "Immediate-Mode Graphical User Interfaces", Retrieved on: Feb. 27, 2013, at: http://mollyrocket.com/861; 2 pages.

Reenskaug, Trygve, "Thing-Model-View-Editor an Example from a Planning System", In Technical Note of XEROX PARC, May 12, 1979, 11 pages.

Sandewall, Erik, "Programming in an Interactive Environment: the LISP Experience", In Journal of ACM Computing Surveys, vol. 10, Issue 1, Mar. 1978, 37 pages.

Shneiderman, Ben, "Direct Manipulation: A Step Beyond Programming Languages", In Journal of IEEE Transactions on Computers, vol. 16, Issue 8, Aug. 1983, 5 pages.

Tillmann, et al., "TouchDevelop: Programming Cloud-Connected Mobile Devices via Touchscreen", In Proceedings of the 10th SIGPLAN Symposium on New Ideas, New Paradigms, and Reflections on Programming and Software, Aug. 17, 2011, 21 pages.

Victor, Bret, "Inventing on Principle", Published on: Jan. 2012, at: http://interblah.net/inventing-on-principle; 2 pages.

\* cited by examiner

1100

```
┌─────────────────────────────────────────────────────────────┐
│  CONSTRUCT DATA STRUCTURE REPRESENTING USER INTERFACE IN A  │
│                      TREE-LIKE MANNER                       │
│                            1102                             │
└─────────────────────────────────────────────────────────────┘
                              │
                              ▼
┌─────────────────────────────────────────────────────────────┐
│       RENDER THE USER INTERFACE BASED ON THE DATA STRUCTURE │
│                            1104                             │
└─────────────────────────────────────────────────────────────┘
                              │
                              ▼
┌─────────────────────────────────────────────────────────────┐
│  IN RESPONSE TO A CHANGE IN THE CODE FROM WHICH THE USER    │
│  INTERFACE IS GENERATED OR A CHANGE IN NON-RENDERING DATA   │
│  AFFECTING THE APPEARANCE OF THE USER INTERFACE, GENERATE   │
│  A NEW VERSION OF THE DATA STRUCTURE BASED AT LEAST IN      │
│  PART ON THE CHANGE IN THE CODE                             │
│                            1106                             │
└─────────────────────────────────────────────────────────────┘
                              │
                              ▼
┌─────────────────────────────────────────────────────────────┐
│  RENDER THE USER INTERFACE BASED ON THE NEW VERSION OF THE  │
│                        DATA STRUCTURE                       │
│                            1108                             │
└─────────────────────────────────────────────────────────────┘
```

FIG. 11

INTERFACE DEVELOPMENT AND OPERATION

BACKGROUND

Software may be developed in development environments. Typical development environments lack versatility in developing some types of software, such as user interfaces. For example, in some typical user interface development environments and/or approaches, the code explicitly constructs the displayed view. However, the explicit construction of views may necessitate many explicit commands for creating collections, adding user interface elements, and so forth. Additionally, the programmer is responsible for writing code that correctly updates the view in response to changes in the application state. Writing correct updating code is difficult and a source of frequent errors, which can leave the view in an incorrect state Moreover, the process of debugging such user interface software code is typically inefficient. For example, to correct a minute problem in a user interface, the developer may need to stop the program, manually search through the software code to locate the code related to the general portion of the user interface experiencing the problem, ascertain the particular code corresponding to the problem, then attempt to adjust the corresponding code to address the problem. Once changes are made, the code may have to be recompiled and the developer may be forced to manually repeat the inputs that resulted in the problem (often taking minutes or hours of exacting input). Once the software has been returned to the state that previously exhibited the problem, the developer may find the problem has 1) not been addressed, 2) was unaffected (i.e. the problem results from other code), 3) the problem has been resolved but the "fix" has resulted in new problems, etc. Should this be the case, the developer is forced to repeat the process until all problems are resolved and no new problems arise, which can result in a significant amount of cost, time and resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for interactive user interface operation and development. For instance, some implementations may generate a user interface data structure representing a user interface, the user interface data structure being generated based at least in part on state data and imperative programming code. Then, in response to a change in one of the imperative programming code or the state data, some implementations may update the user interface data structure and render an updated interactive graphical user interface based on the updated user interface data structure.

BRIEF DESCRIPTION OF THE DRAWINGS

The Detailed Description is described with reference to the accompanying figures. The use of the same reference numbers in different figures indicates similar or identical items.

FIG. 11 illustrates an example process flow according to some implementations that may provide for the updating of a user interface based on changes to the basis of a user interface data structure.

DETAIL DESCRIPTION

Overview

Figure 1:
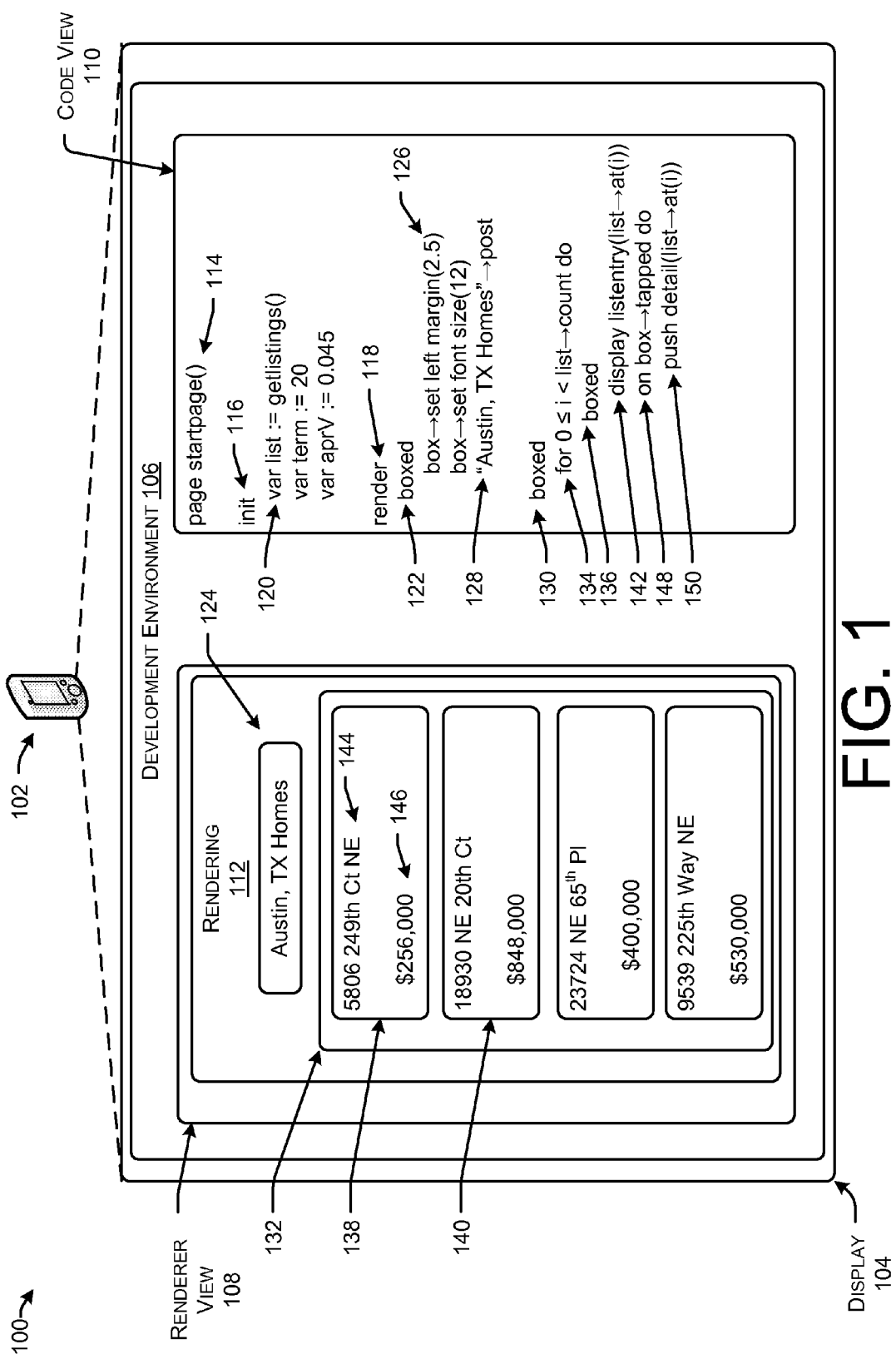
FIG. 1 illustrates an example system according to some implementations including a development environment that may provide for, among other features, programming and development of software including user interfaces and may provide for the live programming of such software.

This disclosure includes techniques and arrangements for the development and operation of user interfaces, such as interactive graphical user interfaces. In some implementations, the system may provide functionality for utilizing a user interface data structure that represents the user interface. In some implementations, the user interface data structure may be a tree structure including nodes corresponding to user interface elements (e.g. boxes, windows, buttons, etc.) and the contents of the user interface elements (e.g. text of boxes or buttons, images within boxes, windows or buttons, etc.). The techniques and arrangements in accordance with this disclosure may further provide functionality for updating or recreating the user interface data structure based on a change in the application state or program code associated with the user interface. For example, in some implementations, a new user interface data structure may be constructed or the existing user interface data structure may be updated when the state of the application changes, by for example, re-executing the display code. In implementations that update the user interface data structure, the existing user interface data structure may be recycled such that the unchanged nodes remain, altered nodes are modified accordingly, new nodes are inserted, and/or obsolete nodes are removed.

In some implementations, the techniques and arrangements disclosed herein may further provide a "live programming" functionality. For example, some implementations may provide for live programming of user interfaces with imperative programming languages. More particularly, some implementations may provide the functionality to a developer that allows for the developer to make changes to application code, such as user interface code, during execution of the application in a development environment, while continuing to execute the application. In some such implementations, the effect of the changes in the application code may be seen in the execution of the application without recompiling, restarting, breaking execution, etc. The live programming functionality may also provide for a tracking, mapping, and/or matching between portions of the application (e.g. the elements of the user interface) and the application code. For example, in some implementations, during execution of the application in a live programming environment, functionality may be provided for a user to indicate a portion of the user interface. In response to the indication of the portion of the user interface, the application code corresponding to, or associated with the portion of the user interface may be shown, for example, in a second window.

Although the discussion herein may describe implementations in which user interfaces are represented by user interface data structures, implementations are not so limited and the techniques and methods discussed herein may be applied to other aspects of applications and/or other types of data structures.

The compiler, interpreter, development environment or application functionalities described herein may be implemented at various levels in the software and hardware of computing systems. Such levels include the Operating System (OS) level, such as in the OS with or without application support, the application level, either separate from OS (i.e. stand-alone) or as a plugin to the OS or a plug-in to another application and so forth. Further, compiler, interpreter, development environment or application functionalities may be implemented universally for all application code or development projects, or the functionality may only be active in select scenarios, such as in specific programming languages available in an environment, classes of programming languages, specified portions of applications (e.g. a particular user interface), classes of portions of applications (e.g. all user interface development projects), and so forth.

It should also be noted that, for readability, interactions between modules may be described herein as signals or commands, but it would be understood by one of ordinary skill in the art that such interactions may be implemented in various ways, such as by function calls between various program modules.

FIG. 1 illustrates an example framework of a system 100 according to some implementations. System 100 includes a computing device 102 that is illustrated as including a touch-screen display 104 that is displaying a development environment 106. As discussed in more detail below, the development environment 106 may provide for, among other features, programming and development of software including user interfaces and may provide for the live programming of such software. In FIG. 1, the development environment is illustrated as providing a renderer view 108 and a code view 110. As discussed in more detail below, the renderer view 108 may provide for the viewing of the output of the execution of code being developed, entered, displayed, etc. in the code view 110. In the particular example shown in FIG. 1, the renderer view 108 is showing a rendering 112 of a page corresponding to the start page procedure 114 displayed in the code view 110. Additional example details of hardware and/or logical structure of the computing device 102 are provided in the discussion of FIG. 2 below. However, to provide for better understanding of the example implementations, prior to addressing FIG. 2, a discussion is provided of the relationship between the code in the code view 110 to the rendering 112 of the start page The example code illustrated in FIG. 1 includes two bodies, an initialization body 116 and a render body 118. While some implementations may include these two bodies, other implementations may include additional and/or other bodies or may combine the bodies into a single body.

The initialization body 116 may be executed prior to the start page being rendered for the first time. The initialization body 116 may declare and/or update global variables, make procedure calls, but, in some implementations, may not create and/or modify user interface (UI) elements, (e.g. boxes). For example, the variable "list" is illustrated as being declared and assigned a value to a procedure call to the "getlistings( )" procedure at 120. In the illustrated example of FIG. 1, the getlistings procedure call downloads a list of properties (i.e. real estate) for sale and stores the downloaded list in the variable "list." As mentioned above, some implementations may restrict the ability of the initialization body 116 to include user interface element code. However, this is not a limitation and other implementations may have partial restrictions or may allow the inclusion of user interface related code in the initialization body without restriction.

The render body 118 may operate to build and/or refresh the display 104 with the user interface illustrated in the renderer view 108. In particular, in the example illustrated in FIG. 1, the render body 118 operates to build and/or refresh the rendering of the start page based on "boxed" statements which are discussed in more detail below. In some implementations, the render body 118 is re-executed in response to changes to the programs variables (such as global variables) or to the code called during rendering (such as but not limited to changes to the code displayed in the code view 110). More particularly, in some implementations, the render body 118 may be re-executed during the same overall execution of the application such that the application is not restarted or otherwise reset in response to the code modification. On the other hand, in some implementations, the initialization body is not re-executed during the rendering. Rather, in such implementations, the initialization body is executed during initialization and not again.

As used herein, boxes are user interface elements of pages displayed in the renderer view 108. In the illustrated examples, boxes are generated based on boxed statements. For example, the boxed statement at 122 corresponds to the box 124.

Regarding the syntax of the example code illustrated in the FIGURES, the scope or body of statements, (such as the "boxed" statement at 122, a "for" statement, an "if" statement, and so on), is based on the order of the code and the tab depth. For example, the statements following and offset (or "tabbed") from the boxed statement at 122 are within the scope or body of the boxed statement and thus may affect the corresponding box and/or may create nested boxes. In particular, the statement indicated by 126 (i.e. box→set margin (2.5)) sets the left margin of the box 124 to 2.5 centimeters. Similarly, the next statement sets the font size of text within box 124 to twelve (12) point font. Text may be added to the box by use of a "post" instruction such as that shown at 128. In particular, the line indicated by 128 causes the text "Austin, Tex. Homes" to be posted (i.e. displayed) in the box 124. As mentioned above, the scope of statements is based on tab depth of following statements. As such, the boxed statement at 130 is not within the scope of the boxed statement at 122 because the boxed statement at 130 has the same tab depth as the boxed statement at 122. The boxed statement 130 corresponds to box 132. Because the boxed statement 130 is not within the scope of the boxed statement 122, the box 132 is rendered outside of and following the box indicated at 124.

Further, due to the difference in scope, the attribute values of box 124 (i.e. 2.5 centimeter left margin) do not affect box 132.

As shown in FIG. 1, the body of the boxed statement may include nested statements, loops, conditionals, procedure calls and so on in a similar fashion to other statements, such as "if" and "for" statements. For example, the body of the boxed statement 130 includes, among other things, a "for" loop 134. Moreover, as mentioned above, the boxed statements may be nested to create nested boxes. Such a nested boxed statement is shown at 136. In operation, statements 130, 134 and 136 operate such that the box 132 includes nested boxes, such as box 138 and box 140. More particularly, the "for" statement at 134 operates to generate a nested box within box 132 for each listing in the variable "list" discussed above (using a "count" of the listings).

During the rendering of each nested box under box 132 (e.g. box 138 and box 140), a procedure call to a "display listentry" procedure 142 is used to render the contents of the nested box. Though not illustrated in FIG. 1, the "display listentry" procedure may utilize further nested boxes to post the address 144 and price 146 of the listing corresponding to the particular box.

The render body code may further include event handlers that are registered on the user interface elements (e.g. boxes) which may respond to events, such as user input. For example, at lines 148 and 150, an event handler is included in the boxes created by boxed statement 136 which operates such that, if one or the boxes is tapped a "push detail" procedure call is performed for the list entry corresponding to the tapped box. In the illustrated example implementation, the push portion of the procedure call indicates that a new page is being pushed to the display. In some implementations, applications developed in the example development environment may maintain a stack-like data structure for pages which allows for pages to be pushed and popped on or off the stack. Returning to the illustrated code, the page being pushed is a "detail" page corresponding to the tapped box. Additional discussion of the "detail" page is provided with regard to FIG. 3.

In general, in response to an event, event handlers may modify global or local variables or perform procedures, such as page navigation by popping the current page or pushing a new page. In some implementations, handlers may not be treated as "render body" code and as such may not be executed as part of rendering the user interface. As alluded to previously, in some implementations, restrictions may be present which restrict the types of code or portions of application code that may be programmed "live." In such cases, event handlers may be in a class of code that is not live programmable while the render body code is live programmable. As such, if a user makes a change to render body code during execution, the changes may take effect immediately without breaking program execution. On the other hand, changes to the event handler code may not take effect until execution is restarted or the development environment may halt execution automatically based on changes to event handler code. Of course, other classes or types of code may also be treated as not live programmable and thus the above discussion is neither limited to event handler code, nor is event handler code limited to being not live programmable.

As will be discussed in more detail below, in some implementations, the boxes (i.e. user interface elements) are maintained or rendered based on a box tree structure. In some implementations, unlike widgets in conventional user interface libraries, boxes are not first-class values, meaning code does not manipulate the box tree structure directly. Instead, the box tree is created as a "side effect" of the execution weaving in and out of boxed statements.

The above discussion provided many details and examples related to FIG. 1 and the disclosed systems and techniques in general. However, it should be understood that the above discussion is not limiting and many variations are possible and would be appreciated in view of this disclosure.

Figure 2:
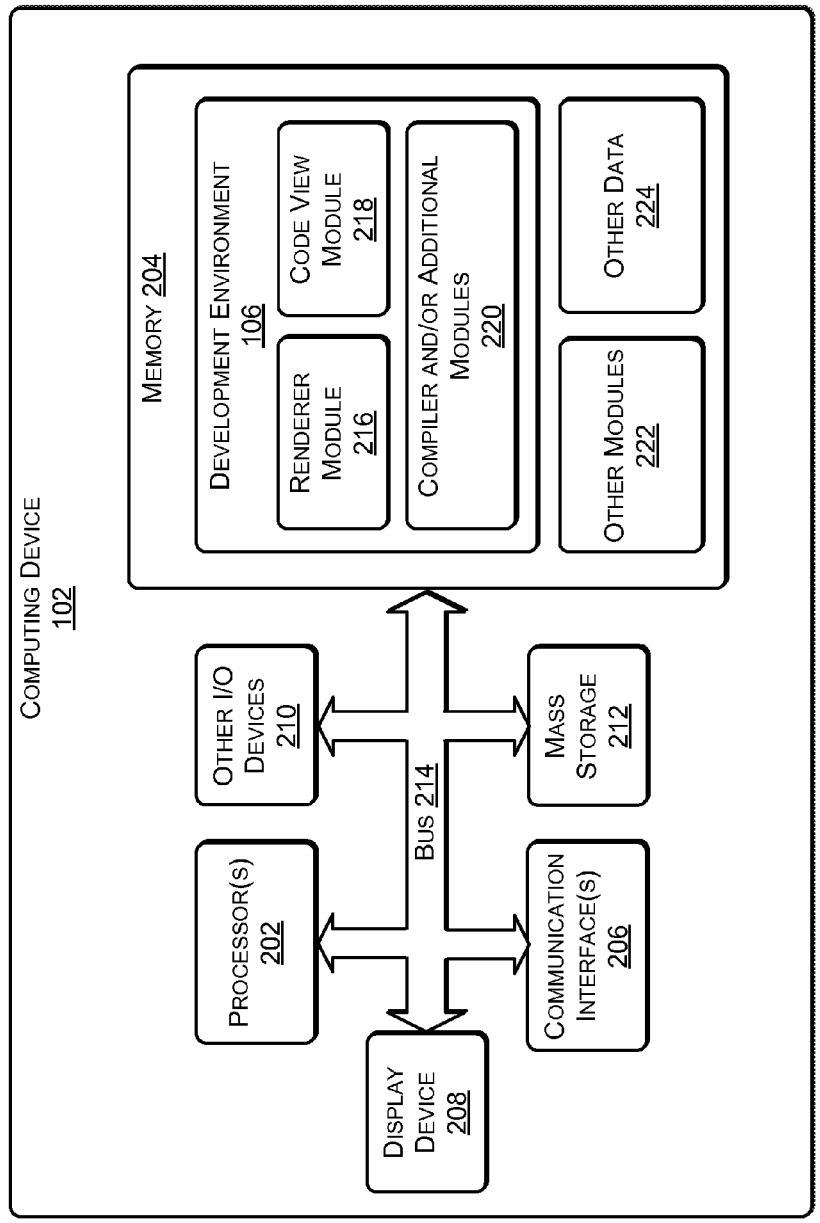
FIG. 2 illustrates an example system in which some implementations may operate.

FIG. 2 illustrates an example configuration of a computing device 200 and an environment that can be used to implement the modules and functions described herein. The computing device 200 may include at least one processor 202, a memory 204, communication interfaces 206, a display device 208 (e.g. touchscreen display 104 or another type of display device), other input/output (I/O) devices 210 (e.g. a mouse and keyboard or the touchscreen display 104 which may operate in response to touches, gestures, etc.), and one or more mass storage devices 212, able to communicate with each other, such as via a system bus 214 or other suitable connection.

The processor 202 may be a single processing unit or a number of processing units, all of which may include single or multiple computing units or multiple cores. The processor 202 can be implemented as one or more microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the memory 204, mass storage devices 212, or other computer-readable media.

Memory 204 and mass storage devices 212 are examples of computer storage media for storing instructions which are executed by the processor 202 to perform the various functions described above. For example, memory 204 may generally include both volatile memory and non-volatile memory (e.g., RAM, ROM, or the like). Further, mass storage devices 212 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 204 and mass storage devices 212 may be collectively referred to as memory or computer storage media herein, and may be a media capable of storing computer-readable, processor-executable program instructions as computer program code that can be executed by the processor 202 as a particular machine configured for carrying out the operations and functions described in the implementations herein.

The computing device 200 may also include one or more communication interfaces 206 for exchanging data with other devices, such as via a network, direct connection, or the like, as discussed above. The communication interfaces 206 can facilitate communications within a wide variety of networks and protocol types, including wired networks (e.g., LAN, cable, etc.) and wireless networks (e.g., WLAN, cellular, satellite, etc.), the Internet and the like. Communication interfaces 206 can also provide communication with external storage (not shown), such as in a storage array, network attached storage, storage area network, or the like.

A display device 208, such as touchscreen display 104 or other display device may be included in some implementations. Other I/O devices 210 may be devices that receive various inputs from a user and provide various outputs to the user, and may include a touchscreen, such as touchscreen display 104, a keyboard, a remote controller, a mouse, a printer, audio input/output devices, and so forth. For example, an audio input device may be utilized to allow for voice input and/or the touchscreen display may provide for gesture based input.

Memory 204 may include modules and components for the computing device 102 according to the implementations discussed herein. In the illustrated example, memory 204 includes the development environment 106 which in turn includes a renderer module 216 that performs operations related to the renderer view 108 and a code view module 218 that performs operations related to the code view 110 described herein. For example, memory 204 may include instructions of a compiler and/or additional modules 220 of the development environment 106 and/or other software or modules that may compile code developed in the development environment 106 for distribution to users as an add-in to another program, a dynamic web page generator, an executable program or so on. The modules 220 may further provide additional functionally to the development environment 106. Memory 204 may further include one or more other modules 222, such as an operating system, drivers, application software, communication software, or the like. Memory 204 may also include other data 224, such as data stored while performing the functions described above and data used by the other modules 222. Memory 204 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 2 as being stored in memory 204 of computing device 102, the development environment 106, renderer module 216, the code view module 218, or portions thereof, may be implemented using any form of computer-readable media that is accessible by computing device 102. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art in view of this disclosure. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Figure 3:
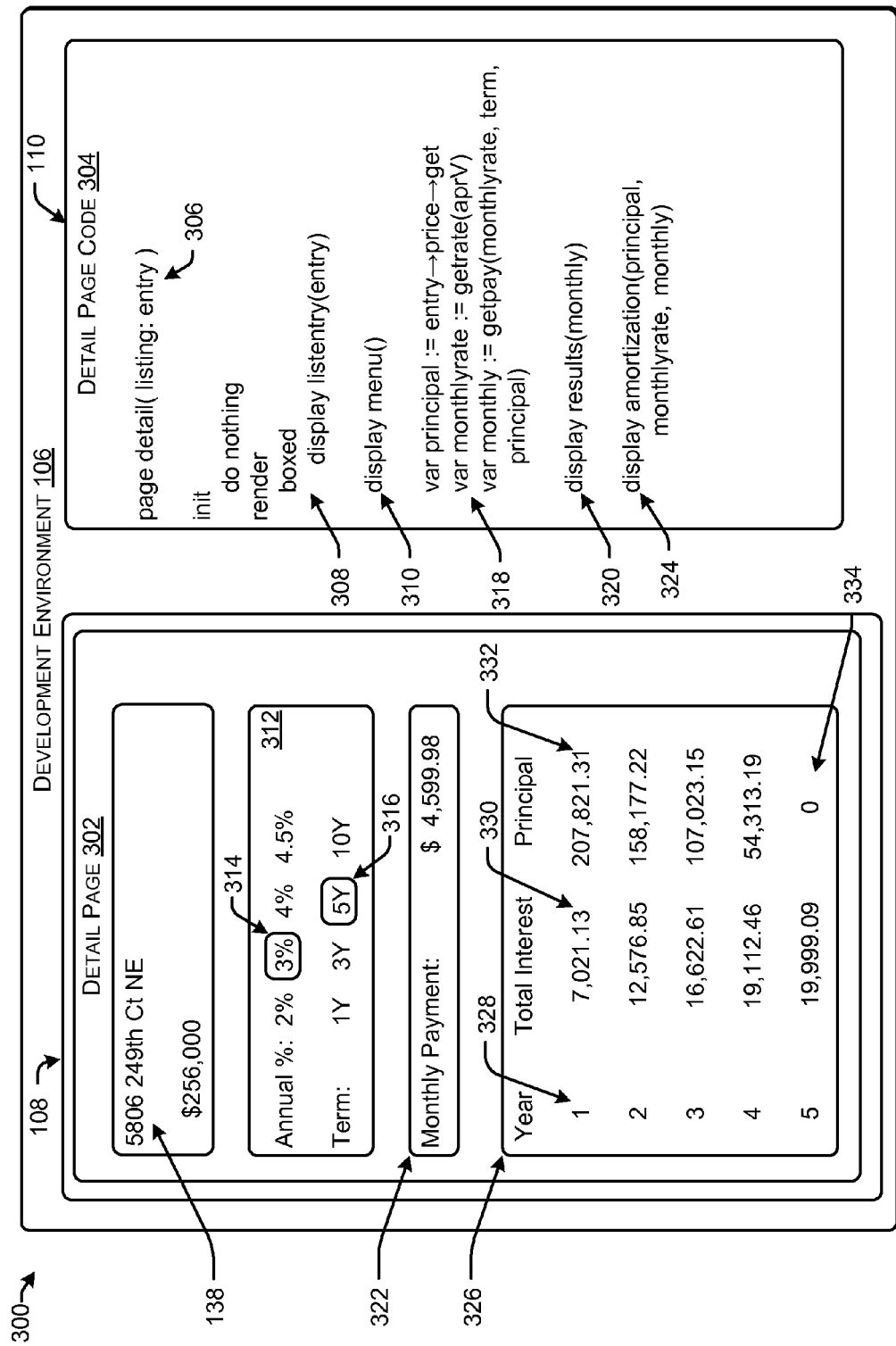
FIGS. 3-6 illustrate further views of example development environment of FIG. 1 and illustrate the operation of the development environment to provide among other features, programming and development of software including user interfaces and may provide for the live programming of such software.

FIG. 3 illustrates another example 300 in which the development environment 106 is utilized in the development of a user interface following the state shown in FIG. 1. In particular, the renderer view 108 illustrated in FIG. 3 may display a detail page 302 based on a user tapping or clicking box 138 in FIG. 1. As discussed above, an event handler at 148 and a push statement at 150 respond to the tapping of box 138 by pushing a detail page for the listing corresponding to the tapped box 138 (e.g. by executing the instruction "push detail(list→at(1))"). In some implementations, the development environment 106 may cause the code view 110 to display the detail page code 304 when the detail page 302 is rendered for display. In particular, the code for the "pushed" detail procedure is displayed. As illustrated, the detail procedure receives a passed variable 306, the listing entry in the list variable corresponding to the tapped box. In this way, the detail procedure causes the rendering of the detail page 302 corresponding to the passed listing variable.

In operation, the execution of the detail page code 304 illustrated in FIG. 3 begins at 308 by generating a title for the detail page 302. In particular, at 308, the detail page code 304 executes the same code as shown at 136 and 142 to render box 138 as the title of the detail page 302. Next, the "display menu( )" procedure call 310 is executed and causes the menu box 312 to be displayed in the renderer view 108. Though not shown in FIG. 3, the code for the menu box 312 includes event handlers for updating the global variables "aprV" and "term" in response to a tapping of nested boxes including the various options. More particularly, each annual percentage rate value (i.e. 2%, 3%, 4%, etc.) is within a nested box (for example, nested box 314 of box 312). By default, these nested boxes have the border attribute of the box set to not display a border. When one of the options is tapped, an event handler toggles the display of the border of the box and sets the variable "aprV" to the corresponding APR value of the tapped box. If necessary, if the border of another APR value is already on, the event handler may cause that border to be toggled as well. Similar event handlers may also operate on the boxes of the term options, such as box 316.

At 318, the detail page code 304 instantiates and assigns values to variables. For example, the variable "monthlyrate" is assigned a value based on the "getrate" procedure and the "aprV" variable, which, as indicated at 314, is currently set to "3%". A monthly payment is determined and assigned to the variable "monthly" by the invocation of the "getpay" procedure.

At line 320, the "display results( )" procedure is called to display box 322. As shown at line 320, the "display results( )" procedure is passed the variable "monthly" such that the monthly payment information is rendered in the renderer view 108.

Figure 5:
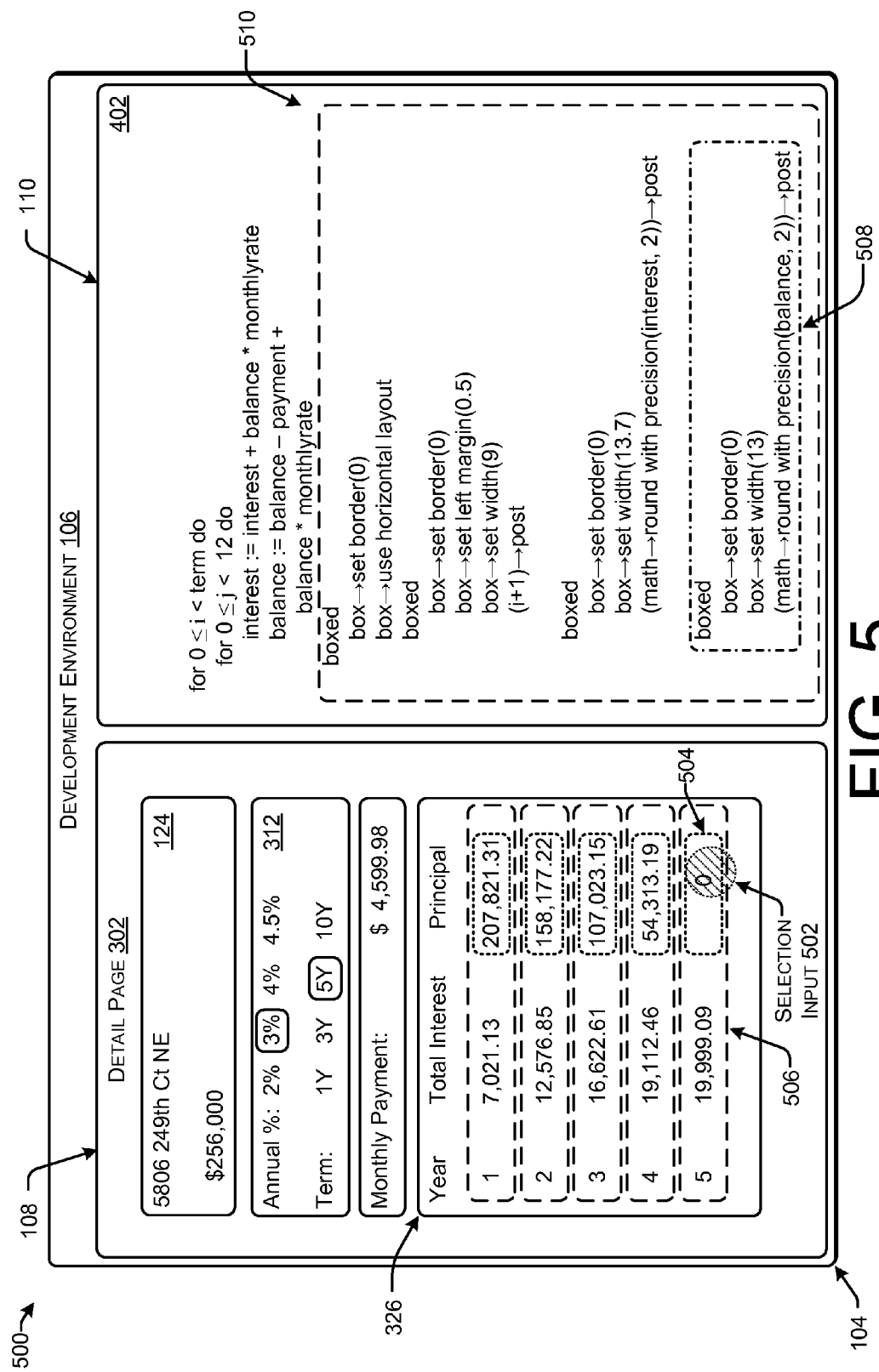
Figure 6:
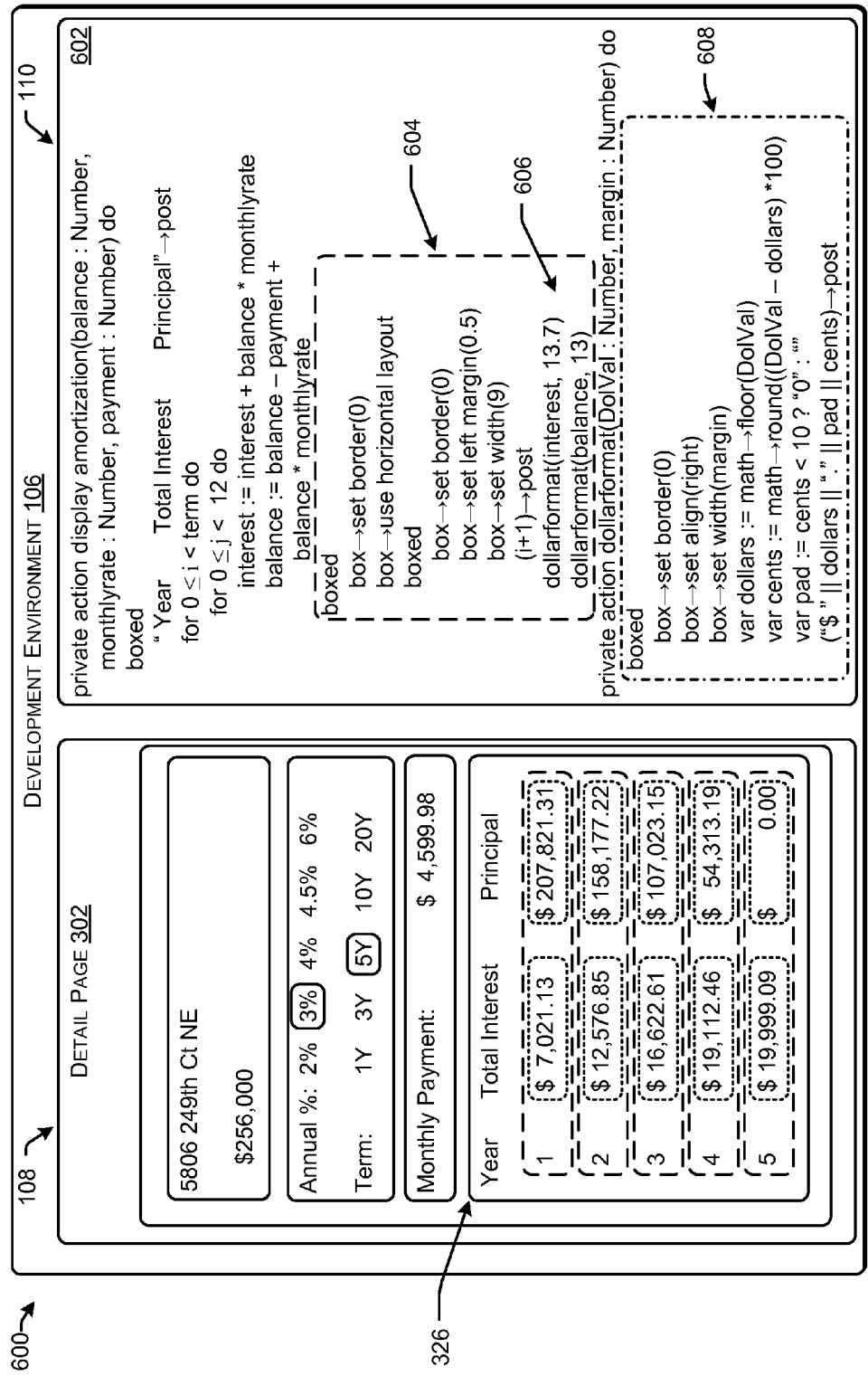

Finally, at 324, the display page code 304 invokes the "display amortization( )" procedure that causes box 326 to be rendered in the renderer view 108. The amortization box 326 includes columns 328, 330 and 332 that correspond to the year, total interest incurred and principal balance, respectively. The amortization box 326 and "display amortization( )" procedure are discussed in more detail with regard to FIGS. 4-7. In particular, FIGS. 4-6 describe an exemplary process by which changes may be made to the amortization box 326, including the interaction between a developer and the development environment 106. Specifically, FIGS. 4-6 illustrate the process of making changes to the code to correct the display of the dollar values in the amortization box which, as shown at 334, are not properly formatted.

Figure 4:
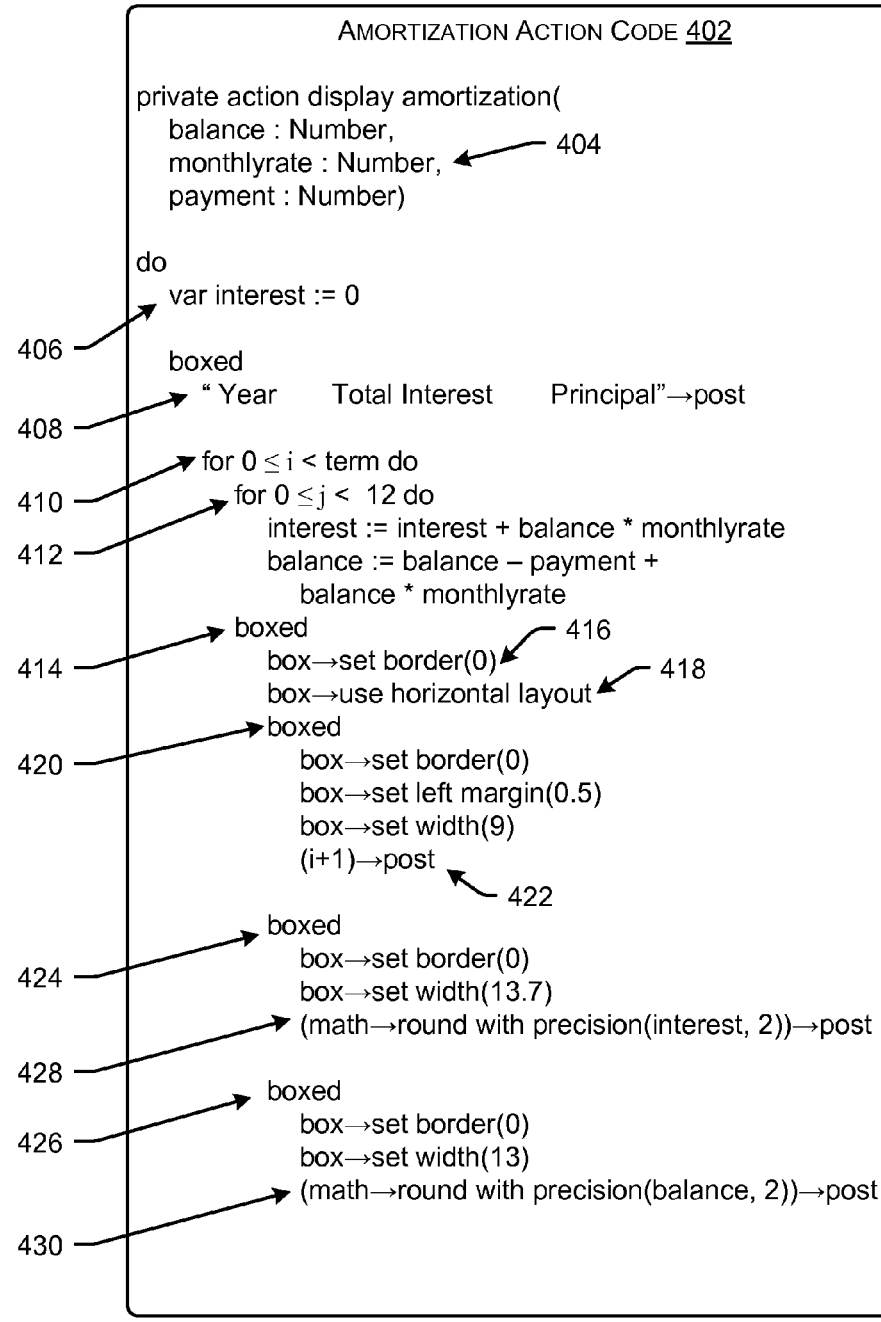

FIG. 4 illustrates an example implementation of the amortization action code 402 to implement the "display amortization" procedure invoked at 324 in FIG. 3.

As shown at 404, the display amortization procedure is passed three parameters, (i.e. the balance, monthlyrate and payment variables). At 406, a local variable "interest" is set to zero. The local "interest" variable is used in the amortization procedure to track the total accumulated interest value for various years. Next, a boxed statement occurs that creates the amortization box 326. Then, at 408, the column title line is posted in the box 326.

Line 410 represents a "for" loop that will execute a number of iterations equal to the number of years indicated by the global variable "term." As shown at 316 in FIG. 3, the term is five years.

The "for" loop indicated at 412 and the statements within the body of the for loop at 412 calculates the accumulated interest and remaining balance across the twelve (12) months of the year for a particular iteration of the for loop at 410.

At 414, once the interest and balance variables are calculated by the for loop at 412, the procedure invokes the boxed statement for the line corresponding to the year of the particular iteration of the for loop at 410. The boxed statement at 414 corresponds to the "year rows" of the amortization box 326. It can be noted that there are no borders shown within the amortization box 326. This is due to the "box→set border(0)" instructions, such as that indicated by 416, that turn off the borders of the nested boxes within the amortization box 326. It is also notable that the boxes for the year, interest, and balance for each year are in a row rather than stacked. This is due to the "box→use horizontal layout" instruction at 418 that indicates that boxes nested under box statement 414 should be in a horizontal layout.

At 420, a boxed statement is invoked which corresponds to the box for the "year number" in the current row of the amortization box 326. In the body of the boxed statement 420, the attributes of the year number box are set and the year number (which is equal to i+1) is posted to the box at 422.

Similarly, the boxed statements at 424 and 426 allow for the posting of the accumulated interest and remaining balance respectively. Of note, the current code for posting the interest and balance values illustrated at 428 and 430 merely rounds the values with the precision of two (2). For example, referring back to FIG. 3, the principal value indicated 334 is merely displayed as "0" without a dollar sign or decimal with two trailing zeros as it should be (i.e. the balance is not shown as $0.00). As mentioned above, FIGS. 5 and 6 show an illustrative process and interaction scenario between the developer and the development environment 106 to correct the code to properly show these values in dollar format.

FIG. 5 provides an example 500 of an initial interaction between the developer and the development environment 106 in the course of the developer modifying the code shown in the code view 110 of FIG. 5 according to some implementations.

Prior to what is displayed in FIG. 5, the developer (i.e. the user) makes a selection input indicated in FIG. 5 as selection input 502. In response to the selection input 502, the development environment 106 determines one or more boxes of the user interface of the detail page 302 located proximate to the selection input 502. As shown in FIG. 5, the boxes proximate to the selection input 502 are the principal box 504 containing the number "0" and the row box 506 within which the principal box 504 is nested. In the example shown in FIG. 5, the development environment 106 determines the code that generates the boxes proximate the selection input 502 and causes the determined code to be displayed in the code view 110 and highlighted or "set off" from other code. In particular, as illustrated in FIG. 5, a border 508 is displayed around the code that corresponds to the box 504 and a border 510 is displayed around the code that corresponds to box 506 and the nested boxes of box 506. Further, after determining the code that corresponds to the selected boxes, the development environment 106 may further determine other boxes displayed in the renderer view 108 which are generated based on the determined code. These boxes may also be highlighted or set off to indicate the boxes that are also created by the common code. Thus, each principal value is highlighted in a similar manner to box 504 and each row box is highlighted in a similar manner to box 506.

Depending on the implementation, the box or boxes that are selected by the selection input 502 and whose code is subsequently displayed and highlighted may be determined in various manners. For example, in FIG. 5, the selection of boxes 504 and 506 could be due to various selection mechanisms. More particularly, one selection method that would result in the selection of boxes 504 and 506 is a method that selects at most the deepest two boxes in the nesting structure that are proximate to the selection. Thus, if only one box is located where the selection input occurs, that box would be selected. If two boxes are located proximate to the selection input, the two boxes would be selected. If three or more boxes are located proximate the selection input, the development environment 106 would determine the two most deeply nested boxes that are proximate to the selection input. In the case of FIG. 5 and selection input 502, box 504 is the deepest nested box proximate to selection input 502 and is in turn nested within the box 506. Another selection method that would result in a selection of box 504 and box 506 would be a selection method that selects two boxes which overlap with the selection input 502 and that have center nearest to a centroid of the selection input 502. Thus, boxes 504 and 506 would be selected. Though box 326 also overlaps with the selection input 502, the center of box 326 is further from the centroid of the selection input 502.

These and many other variations on the selection of the box or boxes based on the selection input would be apparent to one of ordinary skill in the art in view of this disclosure. For example, some implementations may only select one box. Some implementations may select more than two boxes. Still other implementations may determine the number of boxes selected by the selection input based on an analysis of multiple factors such that the number selected will vary based on distances and/or other attributes of the selection input and state of the system.

Further, some implementations may vary as to the extent to which boxes that correspond to the same rendering code as a selected box are highlighted. In the example shown in FIG. 5, all the boxes generated based on the highlighted code segments are highlighted or set off in the renderer view 108. Other implementations may limit or specify the number of additional boxes to be highlighted, dynamically determine the number box additional boxes that are highlighted, or may not highlight additional boxes at all. These and other such variations would be apparent to one of ordinary skill in the art in view of this disclosure.

Based on the updated display in the code view 110, the developer may be able to more easily determine the code that needs to be updated or changed to address the formatting issue in the renderer view 108. The process of implementing such changes is discussed with regard FIG. 6.

FIG. 6 provides an example 600 of a view of the development environment 106 following the state shown in FIG. 5. More specifically, FIG. 6 illustrates an example view of the development environment 106 showing modified code of the amortization procedure 602 subsequent to a developer editing the code to correctly format the display of the dollar values in the amortization box 326. By way of general explanation, the developer has created a new procedure called "dollarformat" which takes a number and a margin value and properly displays the number as a boxed dollar value.

Turning to FIG. 6, the "code highlighting" previously shown as 510 is now shown at 604 and the last two boxed statements previously shown within 510 have been replaced with function calls to the "dollarformat( )" procedure (as shown at 606). Further, the "dollarformat" procedure has been added below the "display amortization" procedure. The development environment 106 now highlights or visually offsets the boxed statement of the dollarformat procedure in the manner in which the boxed statements for the balance boxes of the amortization box 326 were highlighted in FIG. 5. This is indicated by the bordering 608. Further, because the "Total Interest" boxes share the common boxed statement of the "dollarformat" procedure, the renderer view 108 is modified to visually offset both the "Total Interest" and "Principal" boxes.

The correlating of the renderer view 108 and the code view 110, the updating of the renderer view 108 upon changes to the code, and the updating of the renderer view in response to changes in variables or the state of the program execution may be performed in various manners. An example of a system and methods for providing these capabilities according to some implementations is discussed with regard to the FIGS. 7-9.

Figure 7:
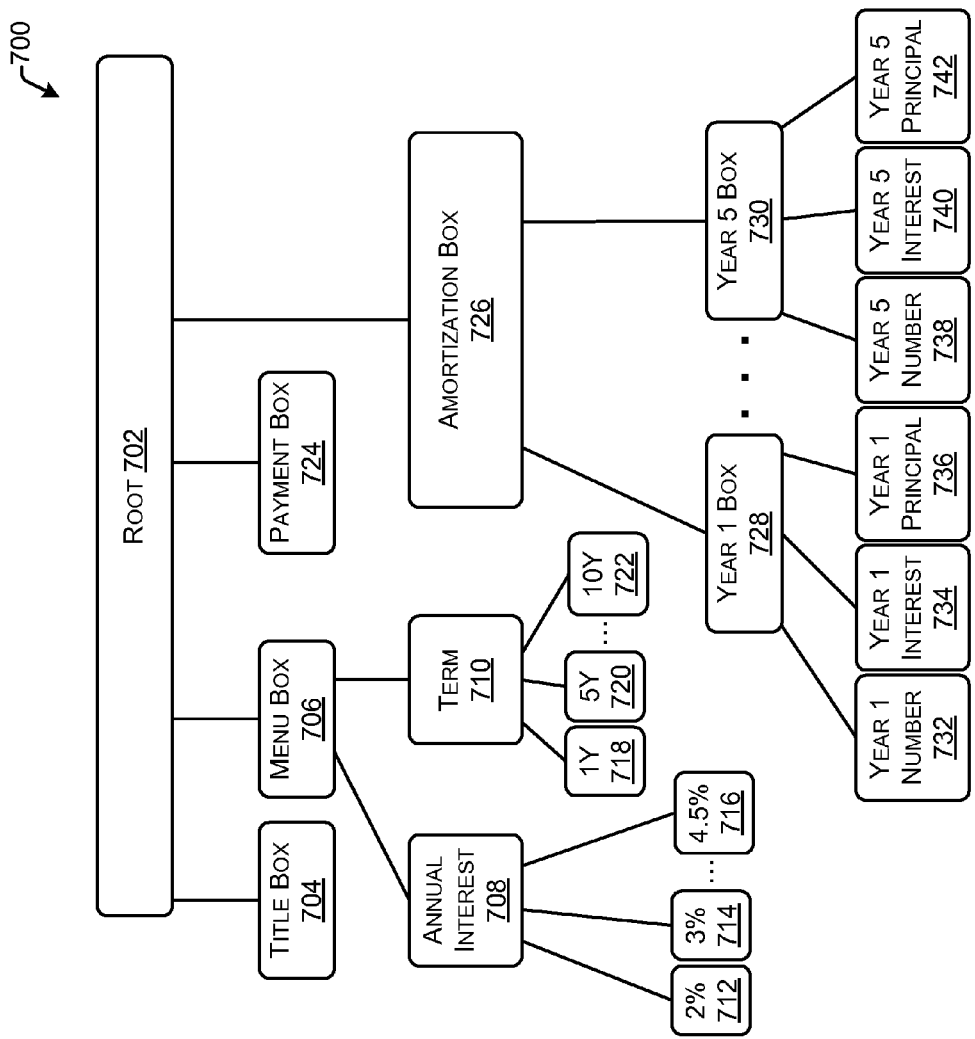
FIG. 7 illustrates an example logical view of a user interface data structure according to some implementations that may be utilized in development and operation of software including user interfaces.

FIG. 7 illustrates an example data structure 700 usable for representing a user interface, and particularly user interfaces that are generated based on the above described box concept. In the discussion herein, the data structure is referred to as a box tree structure 700 (or box tree). However, this should not be seen as a limitation on the structure as other data structures besides trees may be usable.

As a general matter, box trees may include at least two types of nodes, container nodes (or container box nodes) and leaf nodes (or content nodes). Container nodes correspond to the boxes created by boxed statements. Leaf nodes correspond to content statements (such as "post" statements that occur within boxed statements), but are not necessarily boxes on their own. The box tree 700 shown in FIG. 7 includes only the container nodes corresponding to "container boxes" of the detail page 302. This has been done for ease of explanation as the inclusion of leaf nodes would obscure the discussed attributes of box tree 700. Leaf nodes are illustrated in and discussed with regard to FIGS. 8-9.

In box tree 700, each "box" included in the detail page 302, whether shown with a border or not, is represented by a node below the root 702. Stated another way, each of nodes 704-742 corresponds to a respective box in the detail page 302. More particularly, nodes 704 and 706 correspond to boxes 138 and 312 respectively. Nodes 708 and 710 correspond to the annual interest row box and term row box of the menu box 312 (these row boxes do not have visible borders). Nodes 712-716 correspond to the selectable boxes for choosing an interest rate (box 314 is selected and thus has a visible border). Nodes 718-722 correspond to the selectable boxes for choosing a term for the loan (box 316 is selected and thus has a visible border). Nodes 724 and 726 correspond to the monthly payment box 322 and amortization box 326, respectively. Nodes 728 and 730 correspond to the year one row box and year five row box of the amortization box 326. Nodes 732, 734 and 736 correspond to the year number box, the interest box, and principal box nested within the year one row box. Similarly, nodes 738, 740 and 742 correspond to the year number box, the interest box, and principal box nested within the year five row box.

As discussed above, the box tree 700 may include leaf nodes which have not been shown. By way of example, node 704 may include two leaf nodes, one leaf node for the address and one leaf node for the price. Alternatively, node 704 may include two nested container nodes which each in turn include a leaf node for their respective content.

Referring to the detail page 302, boxes 314 and 316 have been selected and thus the borders for boxes 314 and 316 are on. In some implementations, the each node of the box tree 700 stores the attributes data of the respective box to which the node correspond. Thus, regarding boxes 314 and 316, nodes 714 and 720 include data indicating that the border of the corresponding boxes should be on. Similarly, for the "row boxes" discussed above as not having a visible border, the corresponding nodes of the box tree may include information indicating that the border of the corresponding boxes should be off.

Further, some attributes of the boxes may be stored in an inheritable manner such that a nested box, inherits the properties of a parent box. Such an inheritance mechanism may function as a default that may be overridden by the nested boxes own attributes. For example, as discussed above, the year row boxes of the amortization box 326 (e.g. the boxes corresponding to nodes 728 and 730) have border attributes set to hide the border. If the border attribute were inheritable, the nested boxes corresponding to nodes 732-742 would not need statements in the code explicitly hiding the borders of these boxes. More particularly, the "set border" statements under boxed statements 420, 424 and 428 in FIG. 4 would be unnecessary as the border attributes would already be hidden. On the other hand, the inclusion of a "set border(1)" statement at 420 may override the inherited attribute and enable the border.

As previously mentioned, in some implementations, boxes may not be first-class values and, thus, the box tree may be created as a side effect of the execution of the render body rather than by the code directly. This can be seen by a reference to the example code in FIGS. 1-6. In particular, as shown in FIG. 7, based on the code shown the in FIG. 6, the nodes of the box tree are instantiated each time a boxed statement occurs and the order, or layout, of the boxes on the detail page 302 is maintained by the order of the child nodes under each parent node (i.e., the boxes that occur first are the left-most child nodes of each parent node). Thus, the title box 138 occurs before the menu box 312 in the layout because the node 704 is the left-most child node of the root node 702.

While illustrated herein as being based on the order of appearance of child nodes within the box tree, in some implementations, other ordering and layout techniques may be utilized. For example, in some implementations, each child node may include a value that indicates the child node's order of occurrence within the parent node. These and other variations on the rendering of the user interface from the box tree 700 would be apparent to one of ordinary skill in the art in view of this disclosure.

As mentioned above, techniques for utilizing box trees and similar structures in a development environment, such as development environment 106, may vary from implementation to implementation. For example, various techniques may be utilized for mapping code statements, such as the boxed statements, to boxes in the user interface. Techniques utilized in some implementations may utilize mappings in the box trees. Specifically, in some implementations, each node in the box tree 700 and may include an identification of a code statement that generated the node. For example, the node 726 corresponding to the amortization box 326 may include a indication that the first boxed statement of the display amortization procedure 602 shown in FIG. 6. In such an implementation, when the user selects a portion of the user interface, the live programming functionality of the system may operate to determine the corresponding node of the box or boxes selected by the user, then use the code statement identification of the node to ascertain the code corresponding to the selected box. Once the code statement is identified, various techniques may be utilized to determine what portion of the code should be visually set off or highlighted. For example, in some implementations, the dynamic scope of the identified code statements may be utilized. Additional details regarding the mapping between code statements and the box tree are provided with regard to FIG. 9.

Figure 8:
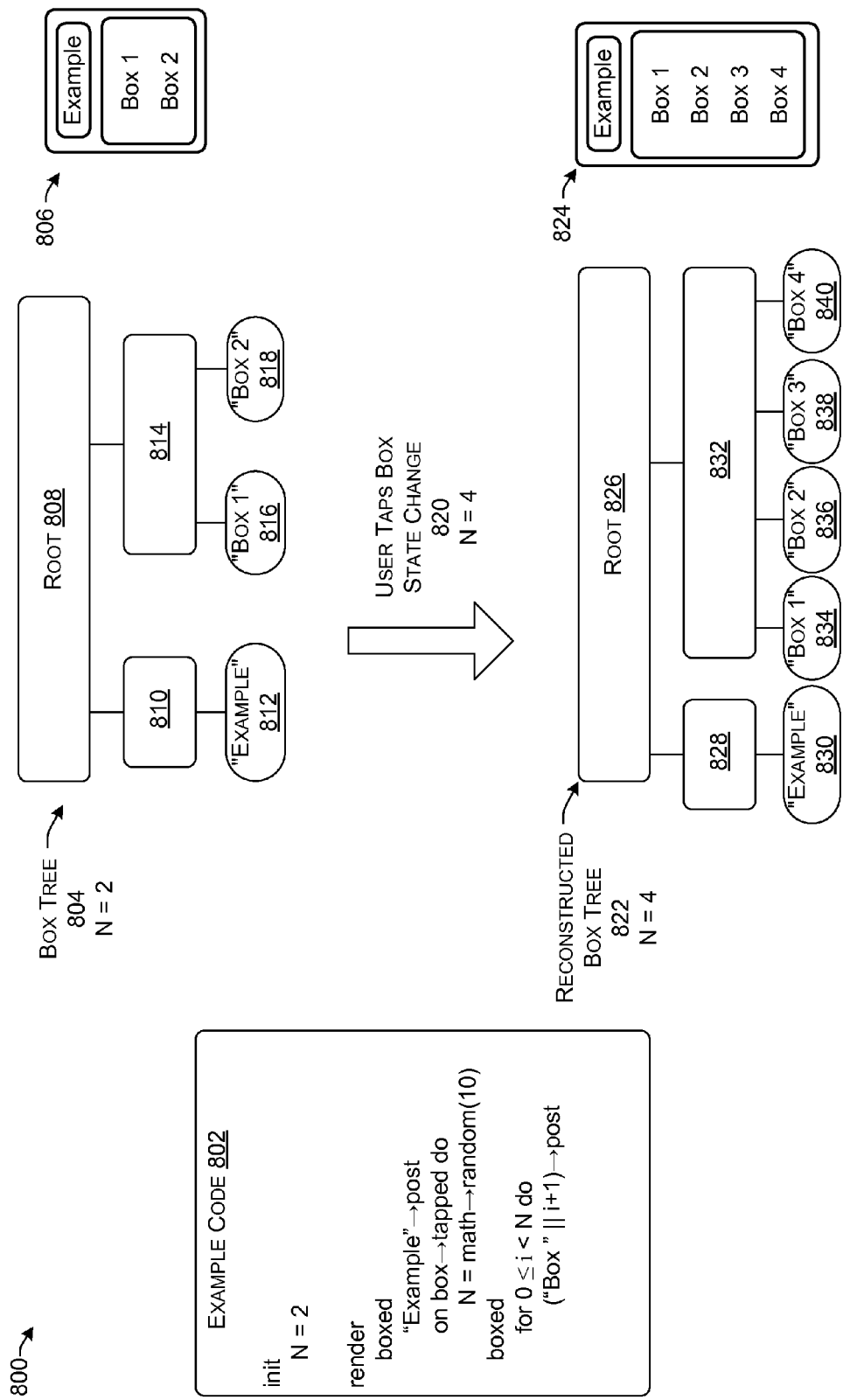
FIG. 8 illustrates a logical diagram and operation of a system according to some implementations that may provide for the construction, maintenance and/or updating of a user interface data structure.

FIG. 8 illustrates an example logical diagram 800 showing a process for updating a box tree according to some implementations. In particular, FIG. 8 illustrates an example implementation of an update procedure occurring in response to an event handler activation in the example code 802. In the example shown in FIG. 8, the system re-creates the box tree at each update. As mentioned above, box trees may include "leaf nodes" that correspond to content statements. The leaf nodes are distinguished from container nodes in FIGS. 8-9 as being ovoid.

In an initial execution of the example code 802, a box tree 804 is created and used to render a user interface 806. In the initial execution of the example code 802, a global variable "N" is set to the value "2". The first boxed statement is executed causing the system to instantiate the box tree 804 including the root node 808 as well as a child node 810 of the root node 808. The execution then proceeds to the content statement, "post," that instantiates a leaf node containing the word "Example." The second boxed statement is then executed causing the system to instantiate a second child node 814 of the root node 808. The second box statement includes a "for loop" that causes the instantiation of leaf nodes of the node 814. In particular, the for loop causes the instantiation of "N" leaf nodes, each containing the word "Box" followed by a respective number from 1 to "N." Thus, the node 814 includes two leaf nodes, leaf node 816 containing "Box 1" and leaf node 818 containing "Box 2." When rendered as user interface 806, the box corresponding to child node 814 contains the phrase "Box 1" from leaf node 816 and the phrase "Box 2" from leaf node 818.

As noted above, in the example illustrated in FIG. 8, the user interface 806 is updated in response to the activation of an event handler. In particular, the box corresponding to node 810 includes an event handler that assigns a random number to the variable "N" in response to the corresponding box being tapped. This event and the subsequent updating of the box tree 804 and user interface 806 is indicated at 820 such that the value four (4) is assigned to the variable "N." In particular, a reconstructed box tree 822 is instantiated and used to render user interface 824.

As mentioned above, in the example implementation shown in FIG. 8, the box tree is re-created at each update. Thus, nodes 826-836 are instantiated and correspond to nodes 808-818. However, the reconstructed box tree 822 further includes leaf node 838 and leaf node 840 due to the value of the variable "N" changing from two (2) to four (4).

Figure 9:
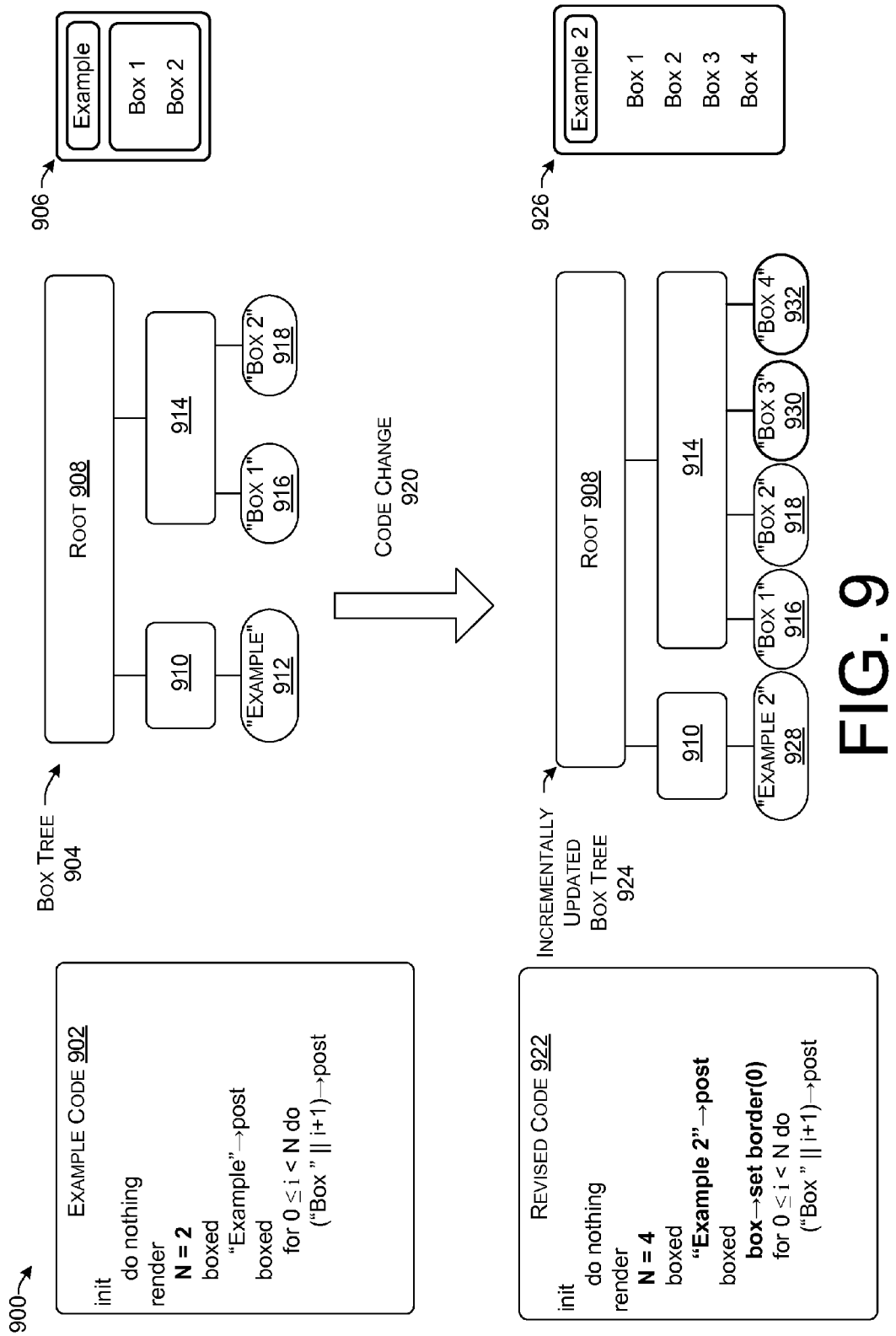
FIG. 9 illustrates another logical diagram and operation of a system according to some implementations that may provide for the construction, maintenance and/or updating of a user interface data structure.

The process shown in FIG. 8 is but one process for updating box trees and similar structures in response to code or state changes. FIG. 9 provides an alternative process which recycles the old box tree rather than recreating the tree at each update.

FIG. 9 illustrates an example logical diagram 900 showing another process for updating a box tree according to some implementations. In particular, FIG. 9 illustrates an example implementation of an update procedure occurring in response to a code change in the example code 902. In the example shown in FIG. 9, rather than re-create the box tree at each update, the illustrated implementation modifies the box tree to perform the update. The example code 902 is similar to the example code 802 with the following exceptions. First, the variable "N" is a local variable and can be modified by developer during execution of the program. Second, the example code 902 does not include an event handler that assigns the variable "N" to a random value.

In the initial execution of the example code 902, the box tree 904 is instantiated and used to render the user interface 906. The nodes of the box tree 904 (i.e. nodes 908-918) are generated in the same manner as nodes 808-818 and thus, for brevity, will not described again.

As mentioned above, the example illustrated in FIG. 9 includes an update based on a code change. The transition is illustrated by the change 920 and is a result of the assignment of the value to the variable N being modified from two (2) to four (4), the title box text changing from "Example" to "Example 2," and the setting of the border of the second container box (the box corresponding to node 914) to hidden. The result of the code change 920 is the updating of box tree 904 into the incrementally updated box tree 924 and the user interface 906 becoming user interface 926. As discussed above, in the example illustrated in FIG. 9, the box tree is modified to implement the update rather than being regenerated entirely as in FIG. 8. An example procedure for updating box tree 904 to box tree 922 follows.

Upon executing a boxed statement, before creating a new container node, the system determines if there is already a container node at the target position in the box tree being updated. If so, the system recycles that box. If a nested box is encountered, the system repeats this process recursively. If there is not already a container node at the target position in the box tree being updated, the system removes any other element that is currently at that position and replaces it with a new container node.

Upon executing a content statement (such as a "post" statement), before creating a new leaf node, the system determines if there is already a leaf node at the target position. If so, the system updates the content of the leaf node (if the content is different) or leaves the content as it is (if the content is the same). If there is not already a leaf node at the target position, the system removes any element that is currently at the target position (if any) and replaces it with a new leaf node containing the desired content.

Once all of the nodes have been processed (i.e., once the render body has been re-executed), any nodes which were already present but which were not "recycled" may be pruned or discarded from the box tree.

Applying this procedure to the example illustrated in FIG. 9, when the first boxed statement is re-executed, the system determines that a container node (i.e. container node 910) is already present at that location in the box tree 924. Accordingly, the system reuses container node 910 and continues execution. When executing the modified post statement, the system determines that a leaf node is in the target position, but that the contents are different. Thus, as shown in leaf node 928, the contents are updated (i.e., the text "Example" is modified to "Example 2"). When the second boxed statement is executed, the system determines that a container node (i.e. container node 914) is already present at that location in the box tree 924 but that the attributes are different. Thus, the container node 914 is recycled and the attributes are updated (i.e., the border attribute is set to hide the border of the corresponding container box). The process continues with nodes 916 and 918 being recycled without change. When the execution reaches the third and fourth iteration of the "for loop," the system finds that there are no leaf nodes present in the tree at the target locations. As such, leaf nodes 930 and 932 are added to the box tree 924 with the text "Box 3" and "Box 4" respectively.

While a particular procedure for implementing an incremental update is discussed with regard FIG. 9, other procedures may be used and would be apparent to one of ordinary skill in the art in view of this disclosure. In particular, variations on the update method may include various routines to determine the nodes of the box tree 904 that are the unchanged, the nodes that are present after the update but whose content or attributes are changed and the nodes that are removed by the update. For example, other implementations may involve more complicated matching algorithms such as content-based or hash-based matching rather than the target position-based matching discussed above. More concretely, with regard to a change such as that shown between the amortization procedure code of FIG. 5 and FIG. 6, various methods may be utilized to maintain the highlighting of the principal boxes inspired of the corresponding box statements being placed in a separate procedure. Using the above-described position based matching, during an update following the modification to include a procedure call to dollarformat, when executing the boxed statement of dollarformat, the previously existing boxes for the total interest and the principle of each year row box will be modified. A similar result may occur in a content matching scenario as the text is unchanged (except for the formatting added which may be accounted for by various programming techniques). However, some implementations of the position based matching procedure described above may not be able to compensate for additional boxes inserted within the box tree structure. For example, if a boxed statement were added between the two boxed statements of the revised code 924, the position based matching discussed above may recycle node 914 for use with the additional boxed statement causing the system to have to re-create node 914 and the leaf nodes 916, 918, 930 and 932. Using a content matching technique with a look ahead function, the system executing the revised code 922 with the additional boxed statement may determine that the additional boxed statement does not include a leaf node structure similar to that present beneath node 914 and thus not reuse node 914 for the additional boxed statement. Subsequently, when the last boxed statement of the revised code 922 is executed the content matching and look ahead technique may determine that the content and structure are similar enough to be a match. These and other variations on the details of the matching procedure would be apparent to one of ordinary skill in the art in view of this disclosure.

It should be noted with regard to FIGS. 8 and 9 that, while FIG. 8 is discussed in the context of a data or state change and FIG. 9 is discussed in the context of a code change, the techniques discussed with regard to each are not so limited. For example, the techniques discussed with regard to FIG. 9 also may be used with regard to a data or state change induced update. Further, the processes illustrated by and discussed with regard to FIGS. 8-9 may be performed in a development environment, but are not so limited. For example, the processes discussed with regard to FIGS. 8-9 may be performed by a commercial application utilized by an end user.

Figure 10:
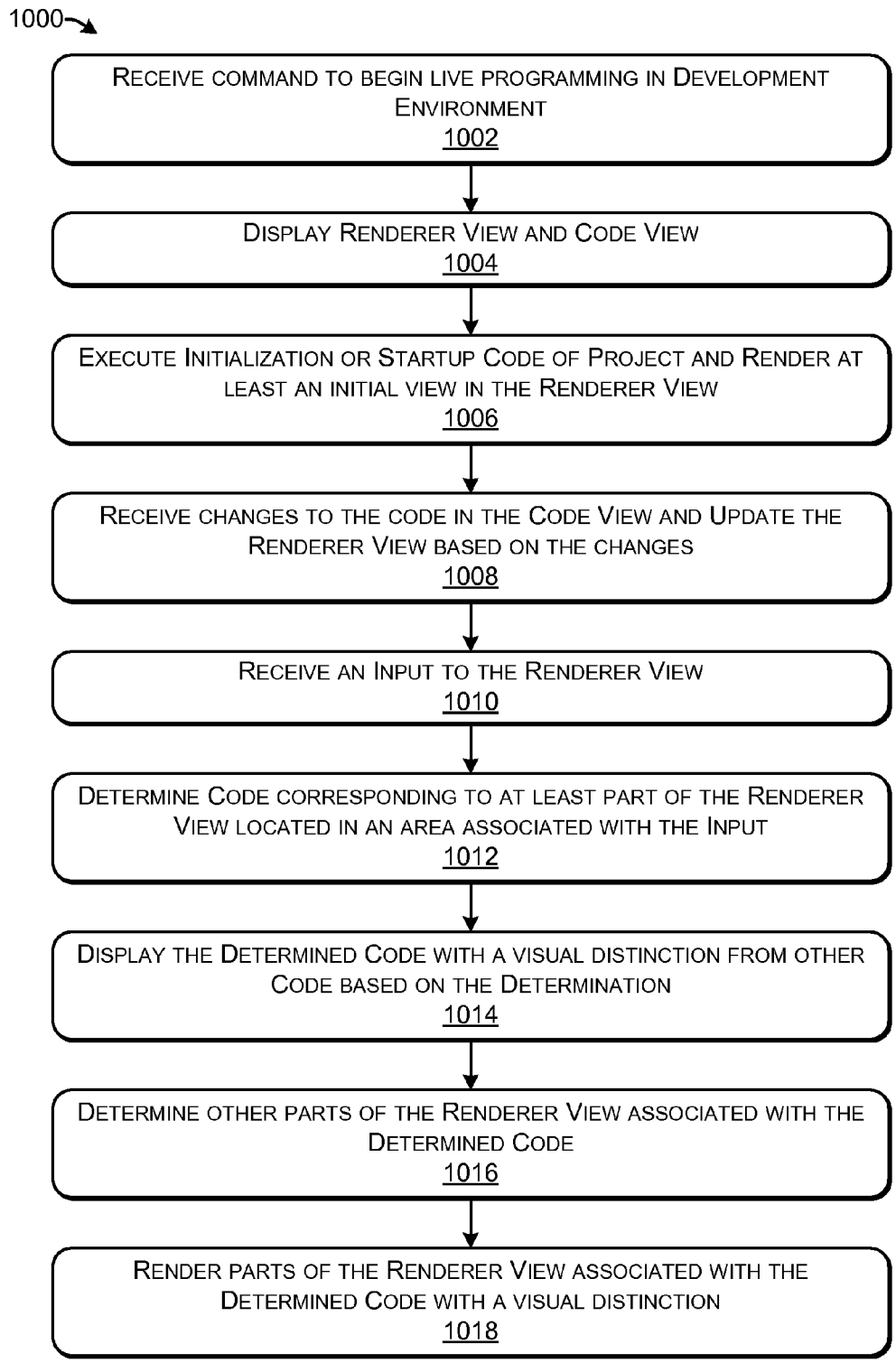
FIG. 10 illustrates an example process flow according to some implementations.

FIG. 10 illustrates an example process flow 1000 according to some implementations. In particular, FIG. 10 illustrates a process flow for many of the above described functions of the development environment 106. In the flow diagrams of FIG. 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 1000 is described with reference to the computing device 102, described above, although other models, frameworks, systems and environments may implement the illustrated process. Other processes described throughout this disclosure (e.g. FIGS. 11-12), shall also be interpreted accordingly.

At 1002, the computing device 102 receives a command to begin live programming in a development environment (such as in development environment 106). At 1004, upon receiving the command, the development environment 106 is displayed such that the renderer view 108 and code view 110 are shown on the display device 208.

At 1006, the system executes the initialization or startup code of a project and renders at least an initial view in the renderer view 108 on the display device 208. As discussed above, the initial view may correspond to the initial screen displayed by the execution of the code shown in the code view 110 prior to user input that affects the displayed rendered view.

At 1008, changes to the code shown in the code view 110 are received and the system updates the renderer view 108 based on the changes to the code view 110. As discussed above, in some implementations, the update may be performed by re-executing the render body of the code and re-creating or modifying and recycling the box tree structure.

At 1010, an input is received to the renderer view 108. At 1012, the development environment 106 determines the code corresponding to at least part of the renderer view 108 located in an area associated with the received input. This may be performed in a manner discussed above. For example, the development environment 106 may determine a node in the box tree that corresponds to a user interface element or box associated with the location of the input and utilizing a mapping from the node to the code in order to determine the code that corresponds to the determined node (and by extension, the user interface element or box associated with the location of the input).

At 1014, the determined code is displayed so as to be visually distinct from other code. For example, the determined code may be displayed in the manner shown in FIG. 6. Of course, other variations on the visual distinctions contemplated.

At 1016, the system determines other parts of the renderer view associated with the determined render code. This may be performed in a manner similar to that discussed above. For example, once the code corresponding to the user interface element or box associated with the location of the input is determined, the nodes of the box tree may be scanned to determine any other nodes associated with the determined code.

Using this determination, at 1018, the other parts of the renderer view associated with the determined code may also be displayed with a visual distinction. Of course, as mentioned previously, the visual the station of additional interface elements may be displayed with a different visual distinction from the interface element or box associated with the input. These and other variations would be apparent to one of ordinary skill in the art in view of this disclosure.

FIG. 11 illustrates an example process flow 1100 according to some implementations. In particular, the process flow 1100 shows an exemplary process for creating a box tree or similar structure, rendering a user interface based thereon, and then updating the data structure and rendered user interface following a code or data change. In particular, FIG. 11 illustrates an exemplary process flow for re-creating the box tree or similar structure each time an update is performed.

At 1102, a computing device operating based on instructions stored in a computer readable storage media constructs a data structure representing a user interface in, for example, a tree structure or other similar structure. Such construction of the tree structure may be performed in the manner discussed above with respect to FIGS. 7-9.

At 1104, the user interface is rendered based on the data structure. Such rendering of the user interface may be performed based on a traversal of the data structure in the manner discussed above with respect to FIG. 7-9. More particularly, the rendering may be based on traversing the data structure in a defined manner in order to determine the layout hierarchy of user interface elements.

At 1106, the system determines or receives notification that the code or state data from which the user interface is generated has changed. In response to the determination or notification, the system may generate a new version of the data structure based at least in part on the changed code or state data. Such a generation of the new version of the data structure may be performed based on a traversal of the render code in the manner discussed above with respect to FIG. 8.

At 1108, the user interface is rendered based on the new version of the data structure. Such rendering of the user interface may be performed in the manner discussed above with respect to FIGS. 7-9 and/or the same manner utilized in 1104.

Figure 12:
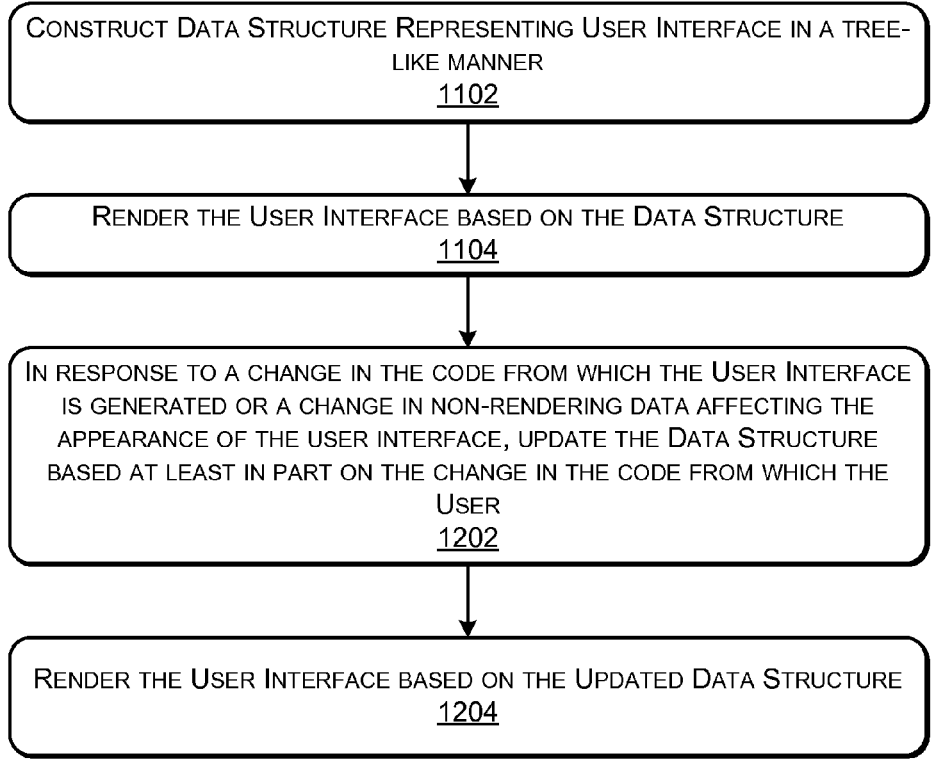
FIG. 12 illustrates another example process flow according to some implementations that may provide for the updating of a user interface based on changes to the basis of a user interface data structure.

FIG. 12 illustrates an example process flow 1200 according to some implementations and provides an exemplary process for updating a rendered user interface following a code or state change. More particularly, process flow 1200 provides for updating the tree or similar data structure utilizing recycling in a manner similar to that discussed above with respect to FIG. 9.

At 1102 and 1104, the system constructs a data structure representing the user interface and renders the user interface based on the data structure as discussed above with regard to FIG. 11.

At 1202, the system determines or receives notification that the code or state data from which the user interface is generated has changed. In response to the determination or notification, the system may update the data structure based at least in part on the changed code or state data. Such an updating of the data structure may be performed in the manner discussed above with respect to FIG. 9.

At 1204, the user interface is rendered based on the updated data structure. Such rendering of the user interface may be performed in the manner discussed above with respect to FIGS. 7-9 and/or the same manner utilized in 1104.

While several examples have been illustrated herein for discussion purposes, numerous other configurations may be used and thus implementations herein are not limited to any particular configuration or arrangement. For example, the discussion herein refers to signals being output and received by particular components or modules system. This should not be taken as a limitation as such communication need not be direct and the particular components or module need not necessarily be a single functional unit. For example, the development environment 106 includes a renderer module 216 and a code view module 218 which are discussed as separate logical components of the system which carry out separate functions and communicate with each other. This is not to be taken as limiting implementations to only those in which the modules directly send and receive signals from one another. The signals could instead be relayed by a separate module upon receipt of the signal. Further, the modules may be combined or the functionality may be separated amongst modules in various manners not limited to those discussed above. Other variations in the logical and practical structure and framework of various implementations would be apparent to one of ordinary skill in the art in view of the disclosure provided herein.

Further, the processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A computing system comprising:
   one or more processors;
   memory;

a user interface module stored in the memory and executable by the one or more processors to:
generate a user interface data structure representing a user interface as a side effect while executing or interpreting imperative programming code, the user interface data structure being generated based at least in part on state data and the imperative programming code, the user interface data structure including a tree structure comprising a plurality of nodes including one or more child nodes and one or more leaf nodes;
render, based at least in part on the user interface data structure, an interactive graphical user interface;
detect a change in one of the imperative programming code or the state data;
in response to the detected change, update the user interface data structure, the update comprising:
determining, for a statement of the imperative programming code corresponding to a user interface element, whether a first node is present in the user interface data structure that corresponds to the statement;
in response to determining that the first node is present in the user interface data structure, determining whether the user interface element or contents corresponding to the first node are changed; and
in response to determining that the user interface element or contents corresponding to the first node are changed, modifying the first node based on the change of the user interface element or contents corresponding to the first node; and
update, based at least in part on the updated user interface data structure, the interactive graphical user interface to render an updated interactive graphical user interface.

2. The computing system of claim 1, wherein a child node of the one or more child nodes corresponds to a respective user interface element of the user interface, the respective user interface element being rendered based at least in part on the child node.

3. The computing system of claim 2, wherein a leaf node of the one or more leaf nodes corresponds to content of the respective user interface element of the child node, the respective user interface element being rendered based at least in part on the leaf node.

4. The computing system of claim 1, the update of the user interface data structure further includes:
in response to determining that the first node is not present in the user interface data structure, inserting a second node into the user interface data structure.

5. The computing system of claim 1, wherein the determination of whether the first node is present in the user interface data structure that corresponds to the statement includes determining if a node is present in a target position in the user interface data structure for the node corresponding to the statement.

6. One or more computer storage media encoded with instructions that, when executed by one or more processors, cause the one or more processors to perform acts comprising:
generating a user interface data structure representing a user interface based at least in part on state data and imperative programming code; and
in response to a change in one of the imperative programming code or the state data, updating the user interface data structure, the updating comprising:
determining, for a statement of the imperative programming code corresponding to a user interface element, whether a first node is present in the user interface data structure that corresponds to the statement;
in response to determining that the first node is present in the user interface data structure, determining whether the user interface element or contents corresponding to the first node are changed; and
in response to determining that the user interface element or contents corresponding to the first node are changed, modifying the first node based on the change of the user interface element or contents corresponding to the first node.

7. The one or more computer storage media of claim 6, wherein the user interface data structure is a tree structure.

8. The one or more computer storage media of claim 7, wherein the user interface data structure comprises a plurality of nodes including one or more child nodes and one or more leaf nodes; and
a child node of the one or more child nodes corresponds to a respective user interface element of the user interface, the respective user interface element being rendered based at least in part on the child node.

9. The one or more computer storage media of claim 8, wherein a leaf node of the one or more leaf nodes corresponds to content of the respective user interface element of the child node, the respective user interface element being rendered based at least in part on the leaf node.

10. The one or more computer storage media of claim 6, the updating of the user interface data structure further comprising:
in response to determining that the first node is not present in the user interface data structure, inserting a second node into the user interface data structure.

11. The one or more computer storage media of claim 6, wherein the determining whether the first node is present in the user interface data structure that corresponds to the statement includes determining if a node is present in a target position in the user interface data structure for the node corresponding to the statement.

12. The one or more computer storage media of claim 6, wherein the determining whether the first node is present in the user interface data structure that corresponds to the statement includes determining whether the first node is present based at least in part on content matching.

13. The one or more computer storage media of claim 12, wherein the content matching includes a hash based matching.

14. A computer implemented method comprising:
under control of one or more computer systems comprising one or more processors and at least one memory, the memory storing executable instructions,
during execution of an application including a user interface, determining a change in one of programming code of the user interface or state data corresponding to the user interface; and
updating a user interface data structure representing the user interface based at least in part on the programming code and the state data, the user interface data structure including a tree structure comprising a plurality of nodes including one or more child nodes and one or more leaf nodes, and the updating including:
determining, for a statement of the programming code corresponding to a user interface element, whether a first node is present in the user interface data structure that corresponds to the statement;
in response to determining that the first node is present in the user interface data structure, determining whether the user interface element or contents corresponding to the first node are changed; and in response to determining that the user interface element or contents corresponding to the first node are changed, modifying the first node based on the change of the user interface element or contents corresponding to the first node.

15. The computer implemented method of claim 14, wherein the one or more child nodes correspond to user interface elements and a child node of the one or more child nodes corresponds to a respective user interface element of the user interface.

16. The computer implemented method of claim 14, further comprising:
prior to the determining a change in one of programming code of the user interface or state data corresponding to the user interface, rendering, based at least in part on the user interface data structure, an interactive graphical user interface including the user interface.

17. The computer implemented method of claim 16, further comprising:
updating, based at least in part on the updated user interface data structure, the interactive graphical user interface during the execution of the application to render an updated interactive graphical user interface.

18. The computer implemented method of claim 15, wherein the respective user interface element of the user interface is rendered based at least in part on the child node.

19. The computer implemented method of claim 15, wherein a leaf node of the one or more leaf nodes corresponds to content of the respective user interface element of the child node, the respective user interface element being rendered based at least in part on the leaf node.

20. The computer implemented method of claim 14, wherein the updating further includes determining that a first node is present when a node is present in a target position in the user interface data structure for the node corresponding to the statement.

* * * * *